US010665223B2

(12) United States Patent
Neil

(10) Patent No.: US 10,665,223 B2
(45) Date of Patent: May 26, 2020

(54) ACOUSTIC AND OTHER WAVEFORM EVENT DETECTION AND CORRECTION SYSTEMS AND METHODS

(71) Applicant: Udifi, Inc., Hendersonville, NC (US)

(72) Inventor: Jack Edward Neil, Hendersonville, NC (US)

(73) Assignee: UDIFI, INC., Hendersonville, NC (US)

( * ) Notice: Subject to any disclaimer, the term of this patent is extended or adjusted under 35 U.S.C. 154(b) by 0 days.

(21) Appl. No.: 16/146,370

(22) Filed: Sep. 28, 2018

(65) Prior Publication Data

US 2019/0103094 A1 Apr. 4, 2019

Related U.S. Application Data

(60) Provisional application No. 62/565,682, filed on Sep. 29, 2017.

(51) Int. Cl.
*G10L 15/20* (2006.01)
*G10L 15/06* (2013.01)
(Continued)

(52) U.S. Cl.
CPC ............ *G10L 15/063* (2013.01); *G06F 3/167* (2013.01); *G10L 15/16* (2013.01); *G10L 15/20* (2013.01); *G10L 25/51* (2013.01); *G10L 25/72* (2013.01)

(58) Field of Classification Search
CPC ... G10L 15/22; G10L 2015/223; G10L 15/30; G10L 15/02; G10L 15/32; G10L 15/26;
(Continued)

(56) References Cited

U.S. PATENT DOCUMENTS 5,829,000 A * 10/1998 Huang .................... G10L 15/22 704/252
7,149,687 B1 12/2006 Gorin et al.
(Continued)

FOREIGN PATENT DOCUMENTS

WO WO 2016/206704 12/2016

OTHER PUBLICATIONS

Baby Cry Detection: Recognition of Baby Cry Audio Signals http://github.com/ginlbia/baby_cry_detection.
(Continued)

*Primary Examiner* — Huyen X Vo
(74) *Attorney, Agent, or Firm* — Dority & Manning, PA

(57) ABSTRACT

Systems and methods for detecting, classifying, and correcting acoustic (waveform) events are provided. In one example embodiment, a computer-implemented method includes obtaining, by a computing system, audio data from a source. The method includes accessing, by the computing system, data indicative of a machine-learned acoustic detection model. The method includes inputting, by the computing system, the audio data from the source into the machine-learned acoustic detection model. The method includes obtaining, by the computing system, an output from the machine-learned acoustic detection model. The output is indicative of an acoustic event associated with the source. The method includes providing, by the computing system, data indicative of a notification to a user device. The notification indicates the acoustic event and response(s) for selection by a user. The computing system, via a continuously learned hierarchical process, may initiate autonomous actions in an effort to halt or otherwise modify the acoustic event.

19 Claims, 8 Drawing Sheets

700

- OBTAIN AUDIO DATA ASSOCIATED WITH A SOURCE — 702
- PRE-PROCESS AUDIO DATA — 703
- ACCESS MACHINE-LEARNED MODEL — 704
- INPUT AUDIO DATA INTO MACHINE-LEARNED MODEL — 706
- OBTAIN OUTPUT FROM MACHINE-LEARNED MODEL — 708
- SEND COMMUNICATION TO USER DEVICE — 710
- ACTIVATE ONE OR MORE PERIPHERAL DEVICES — 712
- OBTAIN DATA INDICATIVE OF SUCCESS OF PERIPHERAL DEVICE(S) — 714
- OBTAIN FEEDBACK DATA — 716

(51) Int. Cl.

| | |
|---|---|
| ***G10L 15/16*** | (2006.01) |
| ***G10L 25/51*** | (2013.01) |
| ***G06F 3/16*** | (2006.01) |
| ***G10L 25/72*** | (2013.01) |

(58) Field of Classification Search

CPC ... G10L 15/285; G10L 15/1822; G10L 15/24; G10L 2015/228; G10L 15/1815; G10L 25/84; G10L 15/00; G10L 15/01; G10L 15/063; G10L 15/08; G10L 15/183; G10L 15/222; G10L 15/28; G10L 17/00; G10L 15/25; G10L 17/04; G10L 17/06; G10L 17/24; G10L 2015/088; G10L 2015/227; G10L 25/78; G06F 13/385; G06F 13/18; G06F 13/26; G06F 16/90332; G06F 21/84

See application file for complete search history.

(56) References Cited

U.S. PATENT DOCUMENTS

| | | | |
|---|---|---|---|
| 8,812,321 B2 | 8/2014 | Gilbert et al. | |
| 8,838,260 B2 | 9/2014 | Pachet et al. | |
| 9,020,822 B2 | 4/2015 | Kalinli-Akbacak | |
| 9,031,243 B2 | 5/2015 | LeBoeuf et al. | |
| 9,202,464 B1 | 12/2015 | Senior et al. | |
| 9,530,080 B2 | 12/2016 | Glazer | |
| 2001/0047265 A1 | 11/2001 | Sepe, Jr. | |
| 2002/0138263 A1 | 9/2002 | Deligne et al. | |
| 2004/0190767 A1* | 9/2004 | Tedesco | G08B 13/19641 382/156 |
| 2011/0075851 A1 | 3/2011 | LeBoeuf et al. | |
| 2015/0019219 A1* | 1/2015 | Tzirkel-Hancock | G10L 15/22 704/244 |
| 2017/0178667 A1 | 6/2017 | Hofer et al. | |
| 2017/0199934 A1* | 7/2017 | Nongpiur | G06F 3/165 |
| 2019/0066670 A1* | 2/2019 | White | G10L 15/22 |

OTHER PUBLICATIONS

Sharp, et al. "App Differentiates a Baby's Crying Sounds", Reuters, Technology News, Dec. 30, 2015, 10 pages.

Lavner, et al. "Baby Cry Detection in Domestic Environment using Deep Learing", International Conference on the Science of Electrical Engineering, 2016, 5 pages.

* cited by examiner

ACOUSTIC AND OTHER WAVEFORM EVENT DETECTION AND CORRECTION SYSTEMS AND METHODS

PRIORITY CLAIM

The present application is based on and claims priority to U.S. Provisional Application 62/565,682 having a filing date of Sep. 29, 2017, which is incorporated by reference herein.

FIELD

The present disclosure relates generally to detecting, classifying, and correcting acoustic and other continuous waveform events using machine-learning models.

BACKGROUND

Certain noises (and other data represented by continuous waveforms) can be indicative of a need to take action. Whether the sound is a neighbor's barking dog, beeping electronics, a gunshot, a wheezing patient, or some other sound, such sounds can be indicative of a need to address a circumstance surrounding that noise. However, an individual may not always be present to hear the noise and, thus, may not be able to take such action.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for detecting acoustic events. The method includes obtaining, by a computing system including one or more computing devices, audio data associated with a source. The method includes accessing, by the computing system, data indicative of a machine-learned acoustic detection model. The method includes inputting, by the computing system, the audio data from the source into the machine-learned acoustic detection model. The method includes obtaining, by the computing system, an output from the machine-learned acoustic detection model. The output is indicative of an acoustic event associated with the source. The method includes providing, by the computing system, data indicative of a notification to a user device of a user. The notification indicates the acoustic event and one or more responses for selection by the user.

Another example aspect of the present disclosure is directed to a computing device. The computing device includes one or more input devices, one or more processors, and one or more memory devices. The one or more memory devices store instructions that when executed by the one or more processors cause the one or more processors to perform operations. The operations include obtaining, via the one or more input devices, audio data from a source. The operations include accessing data indicative of a machine-learned acoustic detection model. The operations include inputting the audio data from the source into the machine-learned acoustic detection model. The operations include obtaining an output from the machine-learned acoustic detection model. The output is indicative of an acoustic event associated with the source. The operations include providing data indicative of a notification to a user device of a user. The notification indicates the acoustic event and one or more responses for selection by the user.

Yet another example aspect of the present disclosure is directed to one or more tangible, non-transitory computer-readable media storing computer-readable instructions that when executed by one or more processors cause the one or more processors to perform operations. The operations include obtaining audio data associated with a source. The source is a human child. The operations include accessing data indicative of a machine-learned acoustic detection model. The operations include inputting the audio data from the source into the machine-learned acoustic detection model. The operations include obtaining an output from the machine-learned acoustic detection model. The output is indicative of an acoustic event associated with a cry of the human child. The operations include providing data indicative of a notification to a user device of a user. The notification indicates the acoustic event and one or more responses for selection by the user.

Other example aspects of the present disclosure are directed to systems, methods, apparatuses, tangible, non-transitory computer-readable media, user interfaces, memory devices, and user devices for acoustic event detection.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
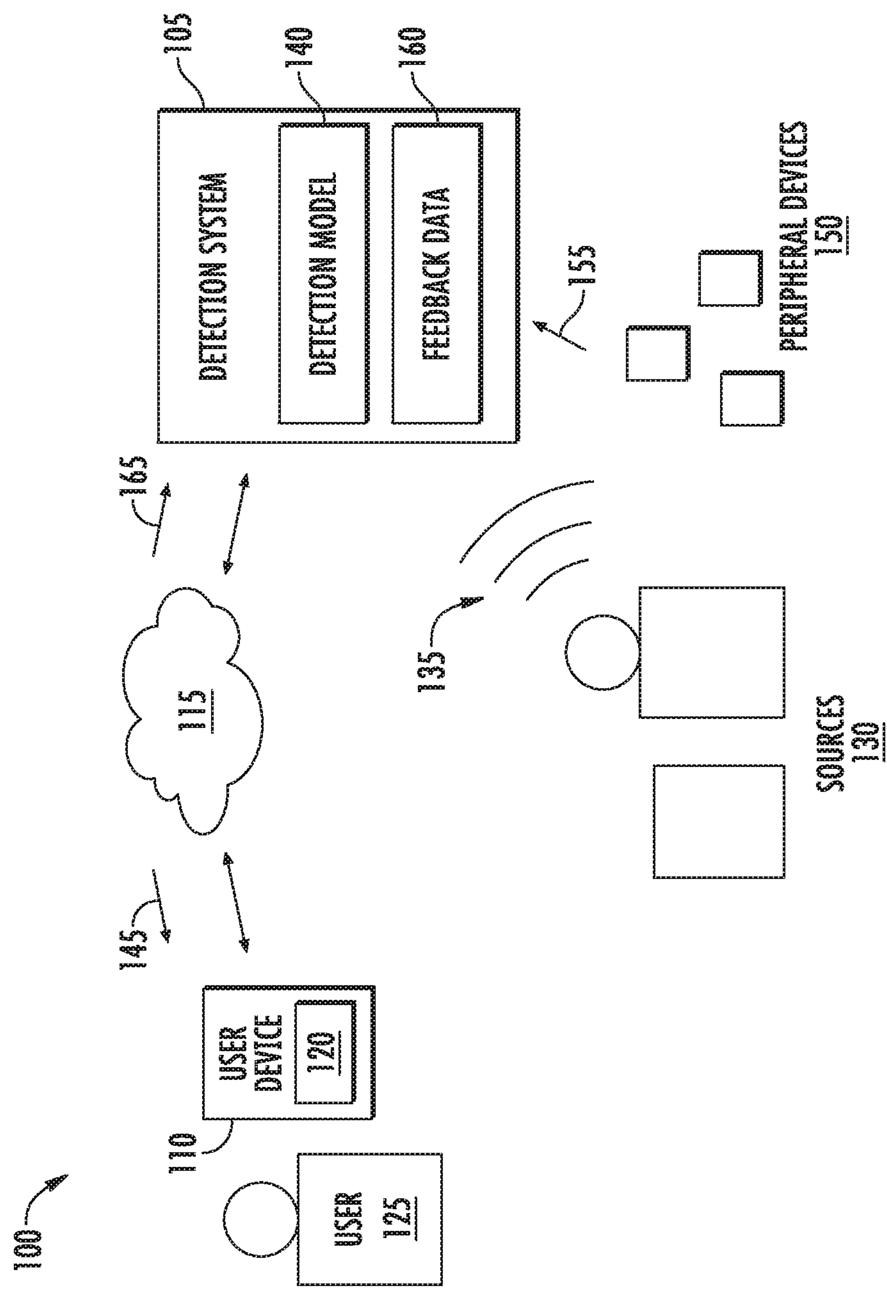
FIG. 1 depicts an example system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment.

Thus, it is intended that aspects of the present disclosure cover such modifications and variations.

Example aspects of the present disclosure are directed to detecting acoustic events using machine-learned technology. For instance, an acoustic detection system can obtain audio data indicative of a sound produced by a source (e.g., human child, etc.). The audio data can include acoustic data, unspecified waveform data, vibration waveforms, and/or other types of audio data. The acoustic detection system can detect whether an acoustic event (e.g., event associated with an acoustic signal, an event associated with waveform data, etc.) has occurred by analyzing the audio data using a machine-learned model (e.g., a neural network). In the event that an acoustic event is detected, the acoustic detection system can alert a user (e.g., that is different than the source). For example, the acoustic detection system can provide a communication to a user device of the user (e.g., to a mobile phone of a parent/guardian of the child). The user device can receive such a communication and display a user interface (and/or provide audible cues) on the user device notifying the user of the acoustic event. The user interface can also display different response options that can be selected by the user. For example, the user can select a user interface element (e.g., soft button) to play audio content such as, for example, a recording of the detected acoustic event (e.g., cry). The user can also select to activate one or more peripheral device(s) that are configured to address the acoustic event. By way of example, the user can select that a sound machine play a recording of the user's voice for the source (e.g., human child) to help dissipate the acoustic event (e.g., to alleviate the cry). By way of another example, the user can select to (or alternatively, autonomously based upon machine-learned progressions of the acoustic event) shut down or throttle an industrial pump if the acoustic event is interpreted as early pump malfunction. As further described herein, the acoustic detection system can learn which peripheral device(s) are the most successful over time and make suggestions and/or activate those devices. Moreover, in the event that the detection is erroneous, the user can indicate as such and the acoustic detection system can re-train its machine-learned model(s) to increase accuracy for future acoustic event detection.

The systems and methods described herein provide a number of technical effects and benefits. More particularly, the systems and methods described herein can utilize a machine-learned model to detect an acoustic event when a user is remote from a source and may not otherwise be able to recognize that such an event has occurred. Moreover, the machine-learned model can be automatically trained and re-trained over time based on detected acoustic events, feedback data, etc. to improve its detection accuracy. As such, the systems and methods of the present disclosure are more computationally flexible and provide an advantage over rules-based detection systems that require manual adjustment to improve its rules over time.

The systems and methods of the present disclosure can proactively provide suggested actions (e.g., peripheral device activation) that are specifically tailored to address the acoustic event. This can provide the user with significant time savings. Moreover, by building and adjusting device hierarchies, as described herein, the systems and methods of the present disclosure can ultimately suggest and/or implement a more appropriate action based on what devices have been previously successful in addressing an acoustic event. This can increase the likelihood that the user will decide to implement the suggested action (e.g., device activation) as well as the likelihood that the acoustic event will be resolved.

The systems and methods of the present disclosure provide an improvement to computing technology such as, for example, acoustic detection computing technology. The systems and methods of the present disclosure enable a computing system to detect an acoustic event, generate/adjust device hierarchies, and improve model accuracy over time. For example, a computing system (e.g., acoustic detection system) can obtain audio data from a source (e.g., a human child). The computing system can access data indicative of a machine-learned acoustic detection model. The computing system can input the audio data from the source into the machine-learned acoustic detection model. The computing system can obtain an output from the machine-learned acoustic detection model. The output can be indicative of an acoustic event (e.g., a cry) associated with the source. The computing system can provide data indicative of a notification to a user device of a user. The notification can indicate the acoustic event and one or more responses for selection by the user. For example, the user can activate one or more peripheral devices to attempt to address the acoustic event. In this way, the systems and methods can allow for the activation of peripheral devices by a user that is remote from the source in order to address an event that the user would not otherwise be able to address. Additionally, in the event that the acoustic event did not, in fact, occur (e.g., as indicated by a user), the computing system can automatically re-train its models to improve model accuracy for future acoustic events. In this way, the systems and methods of the present disclosure can leverage actual acoustic event data and user feedback to created labelled training data for further training of a machine-learned acoustic detection model.

For the systems and methods of the present disclosure, a user can be provided with controls allowing the user to make an election as to both if and when systems, programs or features described herein may enable collection of information (e.g., source audio data, feedback data, etc.), and if such information can be used for aggregate data purposes (e.g., to generate hierarchies, train models, etc.). In addition, certain data may be treated in one or more ways before it is stored or used, so that personally identifiable information is removed. For example, a user's/source's identity may be treated so that no personally identifiable information can be determined for the user/source. Thus, a user may have control over what information is collected and how that information is used.

With reference now to the FIGS., example embodiments of the present disclosure will be discussed in further detail. FIG. 1 depicts an example system 100 according to example embodiments of the present disclosure. The system 100 can include an acoustic detection system 105 and at least one user device 110. The acoustic detection system 105 can be remote from the at least one user device 110. The acoustic detection system 105 and the user device 110 can be configured to communicate via a communications network 115, such as a Bluetooth, LAN, WAN, the Internet, etc., which may be wired and/or wireless, and/or can include any number of wired and/or wireless communication links.

The user device 110 can be various types of user devices, such as, a phone, a smart phone, a tablet, a navigation system, a personal digital assistant (PDA), a laptop computer, a desktop computer, a computerized watch (e.g., a smart watch), computerized eyewear, computerized headwear, other types of wearable computing devices, a gaming system, a media player, an e-book reader, a television platform, an embedded computing device, and/or any other type of mobile and/or non-mobile computing device. In some implementations, the user device 110 can be located (temporarily or permanently) in a vehicle (e.g., an automobile). The user device 110 can include various components for performing various operations and functions as described herein. For instance, the user device 110 can include one or more processor(s) and one or more memory device(s). The user device 110 can include a display device 120 (e.g., screen, touchscreen, etc.) configured to display a user interface for a user 125. In some implementations, the user 125 can provide user input to the user device 110 (e.g., via the user interface), as further described herein.

The acoustic detection system 105 can include various components for performing various operations and functions as described herein. For instance, the acoustic detection system 105 can include cloud-based computing components (e.g., servers) and/or other computing device(s) (e.g., vibration-waveform capturing hardware, video camera/processing hardware, microphone/processing hardware, other user devices, etc.) that are located within proximity of a source of a sound, as further described herein. The device(s) can include one or more processor(s) and one or more memory device(s). The one or more memory device(s) can include, for example, one or more tangible, non-transitory computer-readable media storing computer-readable instructions that when executed by one or more processor(s) cause the one or more processor(s) to perform operations and functions, for example, such as those described herein for detecting acoustic events.

At least a portion of the acoustic detection system 105 (e.g., an individual user device, at home device, edge device, nest device, etc.) can be located within proximity of one or more sources 130. The source(s) 130 can include an inanimate object (e.g., vehicle) and/or an animate object (e.g., human, other animal, etc.) that produces a sound. The acoustic detection system 105 can obtain audio data 135 from the source(s) 130. The audio data 135 can include acoustic data, waveform data (e.g., waveforms associated with vibration, EKG tracings, EEG tracings, etc.). For instance, at least a portion of the acoustic detection system 105 can be located within proximity of the source(s) 130 such that an input device (e.g., microphone, vibration waveform capture device, etc.) of the acoustic detection system 105 is able to obtain sound waves and/or other waveform data from the source 130. By way of example, at least a portion of the acoustic detection system 105 can be located within proximity (e.g., within the same room) of a source (e.g., a human child). The source can produce a sound (e.g., a cry) and the acoustic detection system 105 can obtain (e.g., via a microphone) audio data 135 indicative of the sound (e.g., the associated acoustic signal(s)).

The acoustic detection system 105 can be configured to determine whether an acoustic event has occurred based at least in part on the audio data 135. To do so, the acoustic detection system 105 can include, employ, and/or otherwise leverage an acoustic detection model 140. The acoustic detection model 140 can include, for example, a machine-learned acoustic detection model. The acoustic detection model 140 can be or can otherwise include one or more various model(s) such as, for example, neural networks (e.g., deep neural networks), or other multi-layer non-linear models. Neural networks can include convolutional neural networks, recurrent neural networks (e.g., long short-term memory recurrent neural networks), and/or other forms of neural networks. In some implementations, the acoustic detection model 140 can include a machine-learned binary classifier model.

Figure 2:
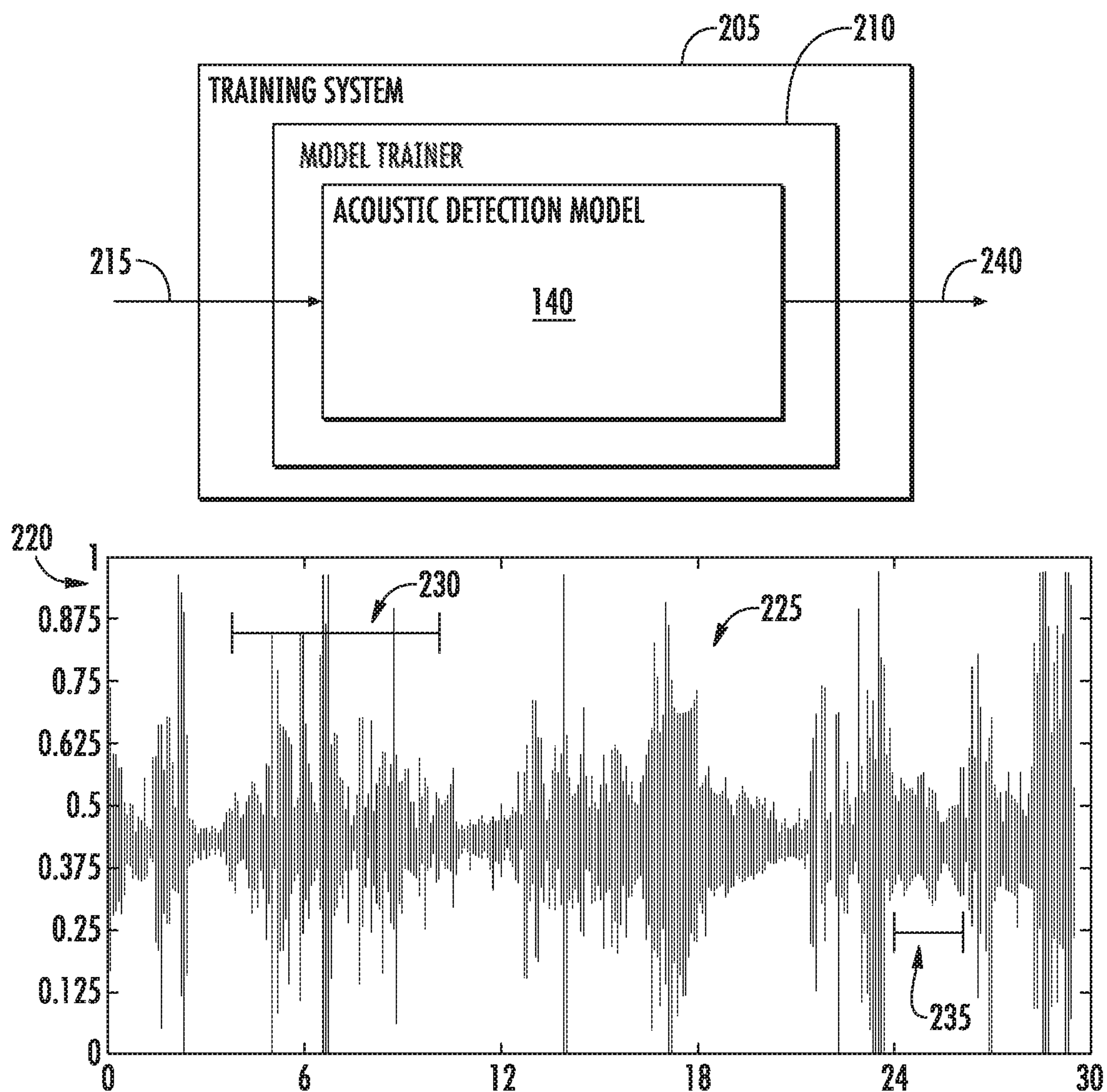
FIG. 2 depicts an example model training data according to example embodiments of the present disclosure.

The acoustic detection model 140 can be trained to identify the occurrence of an acoustic event associated with the source(s) 130. The acoustic event can be an event associated with the production of acoustic data, waveforms, and/or other types of audio data. FIG. 2 illustrates the training of an example acoustic detection model 140 (e.g., acoustic detection machine-learned model) according to example embodiments of the present disclosure. A training computing system 205 can include a model trainer 210 that trains, for example, the acoustic detection model 140 using various training or learning techniques. The training computing system 205 can be included in and/or separate from the acoustic detection system 105. The model trainer 210 can train the acoustic detection model 140 based on a set of training data 215. In some implementations, the training data 215 can be provided or otherwise selected by the training computing 205 and/or the acoustic detection system 105 (e.g., from a database).

In some implementations, the model trainer 210 can train the acoustic detection model 140 using training data 215 indicative of known instances where acoustic events have occurred and/or known instances where acoustic events have not accrued. For example, known instances where an acoustic event has occurred can correspond to human (and/or machine) identified instances where an acoustic event has occurred. Known instances where acoustic event has not occurred can correspond to human (and/or machine) identified instances where an acoustic event has not occurred. For example, the training data 215 can include training audio data 220. The training audio data 220 can include an acoustic signal 225 that has been previously recorded (and stored in an accessible database). A first portion 230 of the acoustic signal 225 can be labelled as an acoustic event (e.g., a test acoustic event). Additionally, or alternatively, a second portion 235 of the acoustic signal 225 can be labelled as not an acoustic event (e.g., not a test acoustic event). The acoustic detection model 140 can be trained using training data 215 that includes training audio data 220 with one or more acoustic signals 215 that are labeled with acoustic events and not acoustic events ("binary training data"). By way of example, to train the acoustic detection model 140 to detect an acoustic event such as a human cry, the acoustic detection model 140 can be trained using training audio data 220 that includes one or more acoustic signals that are labeled with instances in which there is a cry and/or instances in which there is no cry (e.g., noise from a washing machine, air conditioner, dog bark, other background/ambient noise, etc.). In this way, the acoustic detection model 140 can be trained to understand which portions of audio data correspond to an acoustic event (e.g., a cry) and/or to understand which portions do not correspond to an acoustic event (e.g., background noise).

In some implementations, the training data 215 can include lower quality audio data, such that the machine-learned model can learn to evaluate lower quality audio signals. This can ultimately allow the computing system 102 to evaluate audio data of reduced quality, which can lead to usage of a wider range of audio data. In other implementations, the training data 215 may be pre-processed with dynamic range compression, leading to better recognition of more subtle audio data.

The training computing system 205 can train the acoustic detection model 140 based at least in part on the training data 215. For instance, the training computing system 205 can input training data 215 (e.g., with manually and/or automatically labelled acoustic signals). The training computing system 205 can receive a training output 240 indicative of the model's detection of the acoustic event (e.g., whether an acoustic event has occurred) and/or the type of acoustic event within the training data 215. In some implementations, the training output 240 can include a confidence level indicating the model's confidence in its detection of the acoustic event and/or type of acoustic event. The training computing system 205 can analyze the training output 240 to determine the accuracy of the machine-learned model. For instance, the training computing system 205 can compare the output 240 to the training data 215 to determine whether the acoustic detection model 140 correctly identified the acoustic event (e.g., cry). If further training is required (e.g., to increase one or more confidence level(s), to increase accuracy, etc.), the training computing system 205 can provide additional training data 215 and/or indicate that adjustments may need to be made to the acoustic detection model 140.

Figure 3:
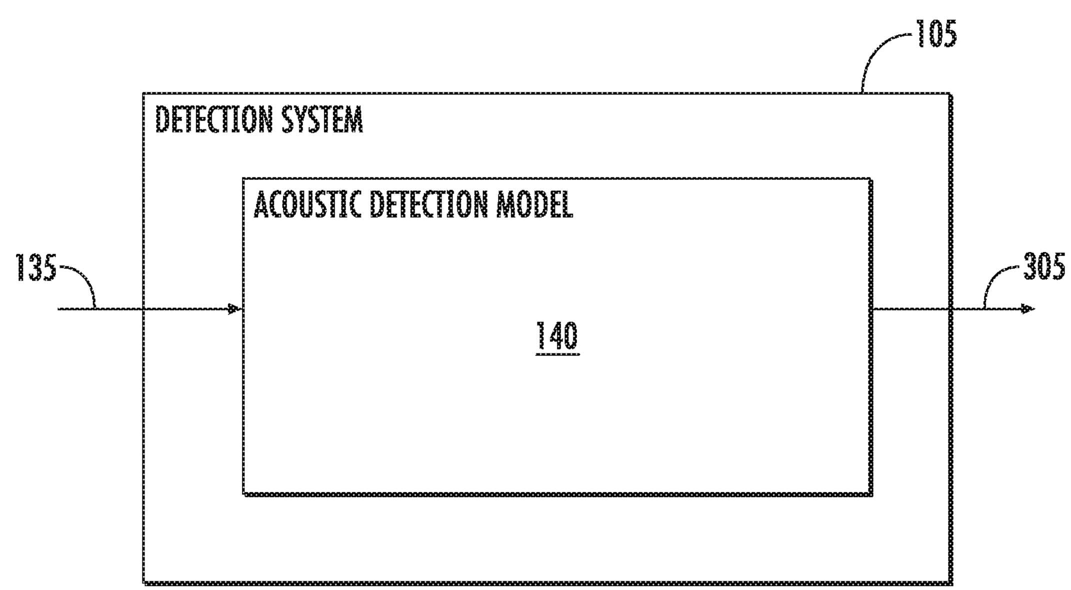
FIG. 3 depicts an example implementation of a machine-learned model according to example embodiments of the present disclosure.

Once trained, the acoustic detection system 105 can input data into the acoustic detection model 140 and receive an output. FIG. 3 depicts an example implementation of the model according to example embodiments of the present disclosure. For instance, as described herein, the acoustic detection system 105 can obtain audio data 135 from a source 130. The acoustic detection system 105 can access data indicative of the acoustic detection model 140 (e.g., machine-learned acoustic detection model). To do so, the acoustic detection system 105 can access a memory that is located within an associated computing device that is proximate to the source 130 (e.g., a memory of the device within the same room as the source) and/or access a memory that is remote from a computing device that is proximate to the source 130 (e.g., via a network 115). The acoustic detection system 105 can input the audio data 135 (e.g., including data indicative of acoustic signals associated with the source 135, etc.) into the acoustic detection model 140. The acoustic detection model 140 can process the audio data 135 to determine whether an acoustic event has occurred and provide an output indicative of the whether the acoustic event associated with the source 130 exists. In some implementations, the acoustic detection model 140 can include a classifier (e.g., binary acoustic event classifier) that provides an output 305 indicative of the existence of an acoustic event in a binary manner. In some implementations, the acoustic detection model 140 can include a regression model (e.g., linear/logistic regression, etc.) that provides an output indicative of a value in a continuous value range. This type of model (e.g., a continuous acoustic event regressor) can indicate, for example, the likelihood that an acoustic event has occurred (e.g., as a percentage, decimal, etc.). Additionally, or alternatively, the output 305 can also indicate the type of acoustic event detection, if any. In some implementations, the output 305 can include a confidence level indicative the model's confidence in the detection of the acoustic event. The acoustic detection system 105 can obtain the output 305 from the acoustic detection model 140.

By way of example, at least a portion of the acoustic detection system 105 (e.g., a computing device with a microphone, processor(s), memory, etc.) can be located within proximity of a source 130 such as a human (e.g., a baby, infant, child, disabled adult, other human/animal in need of care, etc.). The human can produce a sound such as a cry. The acoustic detection system 105 can obtain audio data 135 indicative of the cry. For example, the acoustic detection system 105 can obtain audio data 135 that is indicative of one or more acoustic signals associated with the cry. The audio data 135 can also include one or more acoustic signals associated with other sounds (e.g., background noise, dog bark, passing cars, fan, etc.). The acoustic detection system 105 can access data indicative of the acoustic detection model 140 (e.g., from a local and/or remote accessible memory). The acoustic detection system 105 can input the audio data 135 indicative of the cry (and the other sounds) into the acoustic detection model 140. The acoustic detection system 105 can receive an output 305 indicating the occurrence of an acoustic event (e.g., the occurrence of the cry).

In another example, at least a portion of the acoustic detection system 105 can be within proximity of a source 130 such as a vehicle (e.g., automobile, etc.). The vehicle can produce a grinding and/or growling sound associated with its braking system. The acoustic detection system 105 can obtain audio data 135 indicative of the sound. For example, the acoustic detection system 105 can obtain audio data 135 that is indicative of one or more acoustic signals associated with the grinding and/or growling sound. The audio data 135 can also include one or more acoustic signals associated with other sounds (e.g., engine operation noise, background noise, other noise in a mechanical shop, etc.). The acoustic detection system 105 can access data indicative of the acoustic detection model 140 (e.g., from a local and/or remote accessible memory). The acoustic detection system 105 can input the audio data 135 indicative of the grinding and/or growling sound (and the other sounds) into the acoustic detection model 140. The acoustic detection system 105 can receive an output 305 indicating the occurrence of an acoustic event such as, for example, the presence of a grinding and/or growling sound that is associated with worn down brake pads.

Returning to FIG. 1, the acoustic detection system can perform a number of actions based at least in part on the output 305 (e.g., on the detection of an acoustic event). For instance, the acoustic detection system 105 can notify a user 125 of the occurrence of the acoustic event. The detection system 105 can provide a communication to the user device 110 associated with the user 125. The communication can include data 145 indicative of a notification associated with the acoustic event. The user device 110 can obtain the data 145 indicative of the notification and display the notification for the user 125. The user 125 can be a second user that is different from a first user that may be the source 130 associated with the acoustic event (e.g., the crying human).

Figure 4:
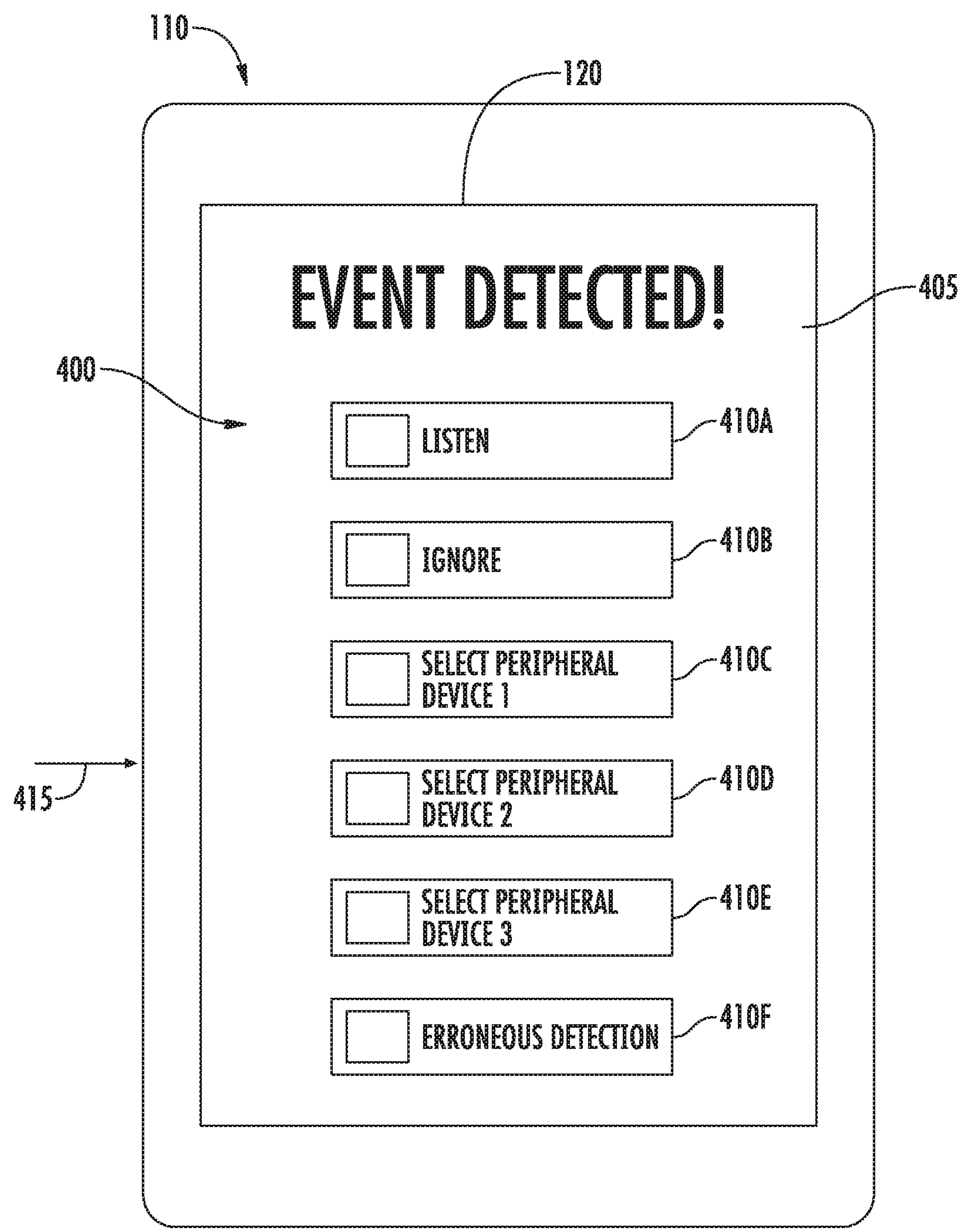
FIG. 4 depicts an example user interface according to example embodiments of the present disclosure.

FIG. 4 depicts an example user interface 400 according to example aspects of the present disclosure. The user device 110 can present the user interface 400 via the display device 120 (e.g., screen) of the user device 110. The user device 110 can be configured to present a notification 405 on a user interface 400 via the display device 120 of the user device 110. The notification 405 can include text, symbols, and/or other indicia that are indicative of the occurrence of an acoustic event (e.g., cry detected). The user 125 can visualize the notification 405 to learn that the acoustic event took place. Additionally, and/or alternatively, the notification 405 can be indicative of one or more responses 410A-F. The response(s) 410A-F can be presented via the user interface 405 via one or more user interface elements (e.g., text boxes, soft buttons, etc.). The responses 410A-F can presented for selection by the user 125. The user 125 can provide user input 415 (e.g., a touch input, a cursor input, keyboard input, etc.) to select a response 410A-F.

The one or more response(s) 410A-F can be associated with a variety of actions. In some implementations, a response 410A can be associated with a play back of the acoustic event via the user device 110. For example, the user 125 can provide user input 415 to the user interface 400 to select the response 410A to play the sound associated with the source 130 (e.g., the detected cry). This can include at least a portion of the audio data 135 associated with the source 130 (e.g., at least the portion associated with the acoustic event). In some implementations, this can also include other sounds that were included in the audio data 135. In some implementations, a response 410B can be associated with ignoring the occurrence of the acoustic event. For example, a user 125 can provide user input 415 to the user interface 405 to ignore the acoustic event (e.g., to momentarily ignore a sound associated by a worn brake pad).

In some implementations, one or more of the response(s) 410C-E can be associated with one or a plurality of peripheral devices 150 (shown in FIG. 1). The peripheral device(s) 150 can be within proximity of the source 130. The peripheral device(s) 150 can include computing and/or mechanical devices. The peripheral device(s) 150 can be configured to attempt to address the acoustic event. By way of example, the peripheral device(s) 150 can include a sound machine (e.g., configured to play a song, voice recording, etc.), a movable device (e.g., automatic rocker), vibration machine, temperature controller, articulating arm, medical device, and/or other device(s) for addressing a cry of a human baby. In another example, the peripheral device(s) 150 can include an pneumatic tool, robotic arm, diagnostic system, and/or other device(s) for addressing an acoustic event (e.g., grinding/growling sound) of a source (e.g., braking system). The user device 110 can provide, to the acoustic detection system 105, data indicative of the selection of a response 410A-F by the user 125 (e.g., via the user input 415).

In some implementations, the acoustic detection system 105 can select and/or suggest a peripheral device from among the plurality of peripheral devices (N peripheral devices). For instance, at a first occurrence of an acoustic event, the acoustic detection system 105 can select a peripheral device (from the N peripheral devices). For instance, at a second occurrence of an acoustic event, the acoustic detection system 105 can select the same and/or another peripheral device (from the N peripheral devices). Overtime the acoustic detection system 105 can learn which peripheral devices to select based on historical learned data. For instance, as described herein, the acoustic detection system 105 can learn from the success, user-selections, and/or feedback associated with the peripheral devices.

Returning to FIG. 1, the acoustic detection system 105 can obtain data 165 indicative of a selection of at least one of the responses 410A-F. In response, the acoustic detection system 105 can perform one or more operations to implement the selected response. For example, in the event that the user 125 provides user input 415 to audibly play audio data indicative of the acoustic event, the acoustic detection system 105 can provide such data to the user device 110 for output. In another example, the acoustic detection system 105 can obtain data 165 indicative of a selection of a response 410C-E associated with a peripheral device 150. The detection system 105 can activate one or more of the peripheral devices 150 based at least in part on the selection of at least one of the responses 410C-E by the user 125. For example, the detection system 105 can provide one or more control command signals and/or other data to activate the respective peripheral device 150 (e.g., to turn on the device and/or cause it to operate in a manner to address the acoustic event). By way of example, the acoustic detection system 105 can provide a control command signal to activate a sound machine to play a voice recording of a parent's voice for a crying baby.

In some implementations, the acoustic detection system 105 can activate one or more peripheral devices 150 without user input. For example, the acoustic detection system 105 can detect an acoustic event (e.g., baby cry), as described herein. The acoustic detection system 105 can select at least one of the acoustic devices 150 based at least in part on the detection of the acoustic event, without receiving data indicative of a selection by a user 125. The acoustic detection system 105 can activate one or more peripheral devices 150 before, after, or without sending data 145 indicative of the acoustic event to the user device 110. In some implementations, the acoustic detection system 105 can activate the peripheral device(s) 150 randomly (e.g., a random selection of a plurality of peripheral devices, in a random order, etc.).

Figure 5:
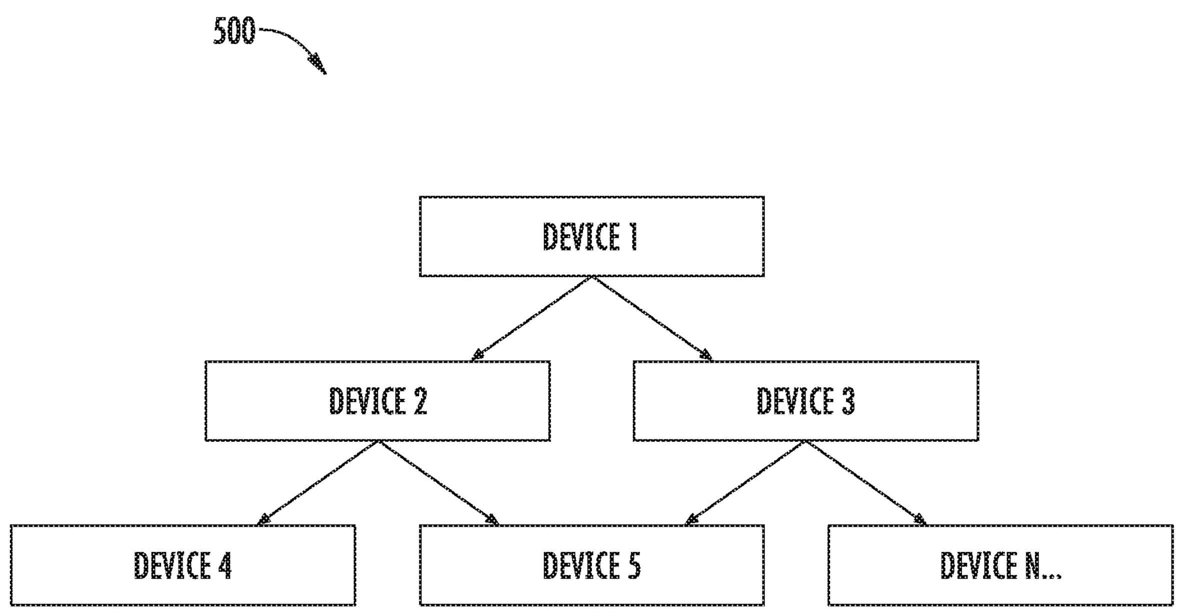
FIG. 5 depicts an example peripheral device hierarchy according to example embodiments of the present disclosure.

In some implementations, the acoustic detection system 105 can activate one or more of the peripheral devices 150 based at least in part on a peripheral device hierarchy. FIG. 5 depicts an example peripheral device hierarchy 500 according to example embodiments of the present disclosure. The peripheral device hierarchy 500 can be a data structure (e.g., tree, table, list, sequence, etc.) that defines which peripheral device(s) 150 are to be activated in the event that an acoustic event is detected. The peripheral device hierarchy 500 can indicate a priority and/or order in which the peripheral device(s) 150 are to be activated. The peripheral device hierarchy 500 can be set by a user (e.g., a parent) that indicates which peripheral device(s) 150 are to be activated based at least in part on an acoustic event and the order in which the peripheral device(s) 150 should be activated. For example, one or more first devices (e.g., a sound machine with a parent's voice recording) can be associated with a highest priority, one or more second devices (e.g., a toy above a crib) can be associated with a next highest priority, one or more third devices (e.g., an automatic crib rocker) can be associated with a third highest priority, etc. The acoustic detection system 105 can access the peripheral device hierarchy 500 (e.g., stored in a local and/or remote accessible memory) and activate the peripheral device(s) 150 based at least in part on these designated priorities.

In some implementations, the acoustic detection system 105 can generate and/or adjust the peripheral device hierarchy 500 based at least in part on the success of the peripheral device(s) 150. For instance, the acoustic detection system 105 can obtain data 155 (shown in FIG. 1) indicative of a success of at least one of the one or more peripheral devices in addressing the acoustic event. To do so, the acoustic detection system 105 can activate a peripheral device 150 and continue to obtain additional audio data associated with the source 130. As the peripheral device 150 operates (e.g., plays a voice recording of the parent's voice, rocks a crib, etc.) the acoustic detection system 105 can determine whether the acoustic event is persisting (e.g., whether the crying is continuing) using similar acoustic detection techniques as described herein. The level of success associated with a particular peripheral device 150 can correspond to the effectiveness of the peripheral device 150 in addressing the acoustic event (e.g., getting the acoustic event to stop). This can be measured by one or more parameters such as, for example, the time it takes to dissipate the acoustic event, the amount of energy (e.g., battery/grid power) utilized by the peripheral device 150 as it attempts to dissipate the acoustic event, whether the peripheral device 150 heightens the acoustic event (e.g., makes crying louder, makes braking sound worse, etc.), a volume frequency, and/or other characteristics associated with the acoustic event, and/or other parameter(s). In some implementations, each of the parameter(s) can be weighted equally when determining the success of the peripheral device 150 in addressing the acoustic event. In some implementations, one or more of the parameters can be assigned different weights when determining the success of the peripheral device 150 in addressing the acoustic event.

The acoustic detection system 105 can generate and/or adjust the peripheral device hierarchy 500 based at least in part on the data 155 indicative of the success of the at least one of the peripheral device(s) 150 in addressing the acoustic event. For instance, the acoustic detection system 105 can generate/adjust a peripheral device hierarchy 500 that assigns a higher priority (e.g., for activation) to a peripheral device 150 that is associated with a higher level of success and a lower priority to a peripheral device 150 that is associated with a lower level of success. By way of example, the peripheral device hierarchy 500 can list the one or more peripheral devices 150 in order of their respective levels of success. In this way, the peripheral device(s) 150 with historically higher levels of success can be activated before the peripheral devices 150 with historically lower levels of success, and so on.

In some implementations, the acoustic detection system 105 can generate and/or adjust a peripheral device hierarchy 500 based at least in part on an aggregate of success data. For instance, the acoustic detection system 105 can obtain data associated with a plurality of peripheral devices located in a plurality of locations and associated with a plurality of sources. Each of the sources may produce sound indicative of a similar type of acoustic event. The acoustic detection system 105 can obtain data indicative of the success of the peripheral devices in addressing the different acoustic events from different sources (e.g., located at the plurality of different locations). The acoustic detection system 105 can generate and/or adjust a peripheral device hierarchy 500 based at least in part on the data indicative of the success of the peripheral devices in addressing the different acoustic events from different sources.

By way of example, a portion of the acoustic detection system 105 (e.g., a first device configured to at least obtain audio data) can be located proximate to a first source (e.g., a first human child) at a first location. A second portion of the acoustic detection system 105 (e.g., a second device configured to at least obtain audio data) can be located proximate to a second source (e.g., a second human child) at a second location. The second source can be of a similar type as the first source. The second location can be different than the first location.

The acoustic detection system 105 can obtain audio data associated with the first source via the first portion and can detect the occurrence of a first acoustic event associated with the first source (e.g., a cry from the first human child), as described herein. The acoustic detection system 105 can activate one or more first peripheral devices (e.g., based on a user selection and/or without user selection) to attempt to address the first acoustic event associated with the first source. The acoustic detection system 105 can obtain a first set of data indicative of the success of the one or more first peripheral devices in addressing the acoustic event associated with the first source.

The acoustic detection system 105 can obtain audio data associated with the second source via the second portion of the acoustic detection 105 and can detect the occurrence of a second acoustic event associated with the second source (e.g., a cry from the second human child). The second acoustic event can be of a similar type as the first acoustic event. The acoustic detection system 105 can activate one or more second peripheral devices (e.g., based on a user selection and/or without user selection) to attempt to address the second acoustic event associated with the second source. The acoustic detection system 105 can obtain a second set of data indicative of the success of the one or more second peripheral devices in addressing the acoustic event associated with the second source.

The acoustic detection system 105 can generate and/or adjust a peripheral device hierarchy 500 based at least in part on an aggregation of the first set of data indicative of the success of the one or more first peripheral devices in addressing the acoustic event associated with the first source and the second set of data indicative of the success of the one or more second peripheral devices in addressing the acoustic event associated with the second source. For instance, the acoustic detection system 105 can process this data to determine which of the first peripheral device(s) were successful in addressing the first acoustic event and which of second peripheral device(s) were successful in addressing the second acoustic event. The acoustic detection system 105 can generate and/or adjust a universal peripheral device hierarchy that can be used for the first peripheral device(s) and/or the second peripheral device(s) based on such data. In some implementations, the acoustic detection system 105 can generate and/or adjust a first peripheral device hierarchy associated with the one or more first peripheral devices based at least in part on success of the second peripheral device(s). Additionally, and/or alternatively, the acoustic detection system 105 can generate and/or adjust a second peripheral device hierarchy associated with the one or more second peripheral devices based at least in part on success of the first peripheral device(s). In this way, the acoustic detection system 105 can leverage the success of various peripheral device(s) associated with a variety of different sources (e.g., at different locations) to determine which peripheral device(s) may be the most effective in addressing the acoustic event. The acoustic detection system 105 can utilize demographic, geographic, environmental, and situational data associated with each peripheral device to generate predictive associations, which can then be weighed into the peripheral device hierarchy 500, thereby improving the likelihood that the peripheral device hierarchy 500 is optimized for the current situation.

Figure 6:
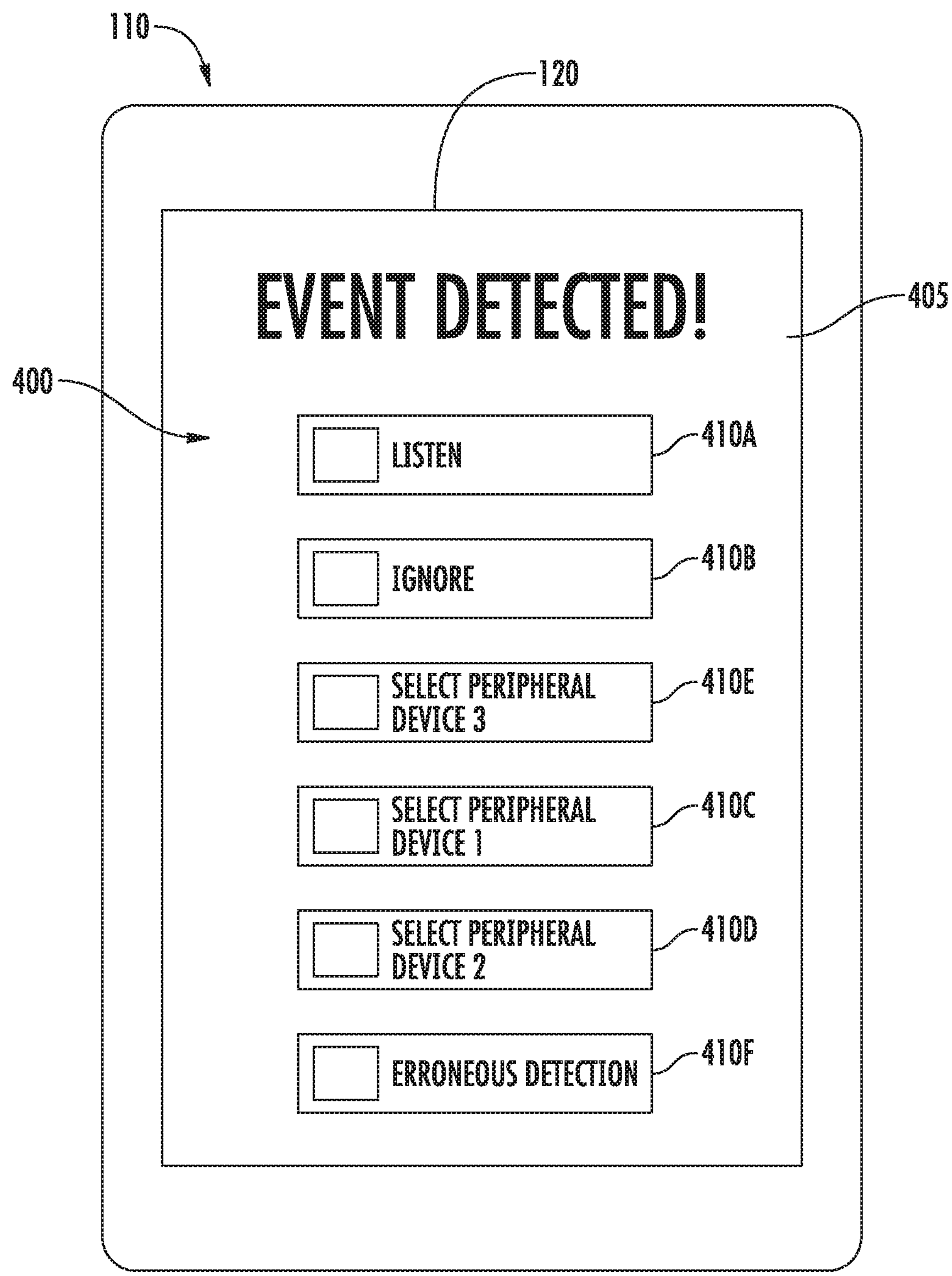
FIG. 6 depicts an example user interface according to example embodiments of the present disclosure.

In some implementations, the notification 400 can be based at least in part on the peripheral device hierarchy 500. For example, as shown in FIG. 6, the response options displayed via the user interface can be presented in accordance with the peripheral device hierarchy 500 and/or an adjustment thereto. By way of example, the user interface 400 can present a selectable response 410E associated with a third peripheral device in a more prominent manner (e.g., first, higher, highlighted, emphasized, etc.) than a selectable response 410C associated with a first peripheral device in the event that the third peripheral device is associated with a higher level of success than the first peripheral device in addressing the type of acoustic event detected. Additionally, and/or alternatively, the user interface 400 can present a selectable response 410D associated with a second peripheral device in a less prominent manner (e.g., last, lower, de-emphasized, etc.) than the selectable responses 410E and/or 410C associated with the third and first peripheral devices, respectively, in the event that the second peripheral device is associated with a lower level of success than the third and/or first peripheral devices in addressing the type of acoustic event detected. In this way, the acoustic detection system 105 can present the selectable response options in a manner that allows the user 125 to more readily determine what has been successful in the past.

The data structure shown in FIG. 5 is meant to serve as an example and is not intended to be limiting. The acoustic detection system 105 can access one or more other data structures that are indicative of the peripheral devices. As described herein, in some implementations, the acoustic detection system 105 can select an acoustic device without traversing the peripheral device hierarchy 500. The acoustic detection system 105 can select and/or suggest a peripheral device from among the plurality of peripheral devices (N peripheral devices) based at least in part, for example, on historical learned data.

The acoustic detection system 105 can gather feedback data indicative of the accuracy of its acoustic event detection. As shown in FIGS. 4 and 6, the user interface 400 can present a selection response 410F (e.g., via a user interface element) that allows the user 125 to indicate that an acoustic event did not in fact occur. For instance, the user 125 can listen to a playback of the acoustic event, as described herein. The user 125 can provide user input 415 to the user interface 400 (e.g., to select the response 410F) to indicate that the acoustic event did not occur and/or that the playback was not indicative of the acoustic event. In some implementations, a software application running on the user device 125 may provide another user interface and/or other user interface elements to prompt the user 125 to provide additional information associated with the erroneous detection (e.g., the type of acoustic event actually occurred, quality of playback, etc.). The user device 110 can provide feedback data 160 that indicates that the acoustic event was erroneously detected (e.g., in response to the user's selection of the associated response 410F) and/or the additional information, if any.

The acoustic detection system 105 can obtain the feedback data 160 associated with the acoustic event (e.g., via the networks 115). The acoustic detection system 105 can re-train the acoustic detection model 140 (e.g., the machine-learned acoustic detection) based at least in part on the feedback data 160. For example, audio data associated with the erroneously detected acoustic event can be labelled as a non-acoustic event and be used as training data to re-train the acoustic detection model 140 using similar training techniques to those described herein. In some implementations, the acoustic detection model 140 can use feedback from a plurality of different users to re-train the acoustic detection model 140. In this way, the acoustic detection system 105 can utilize the feedback data 160 to improve the accuracy of the acoustic detection model 140 over time.

Figure 7:
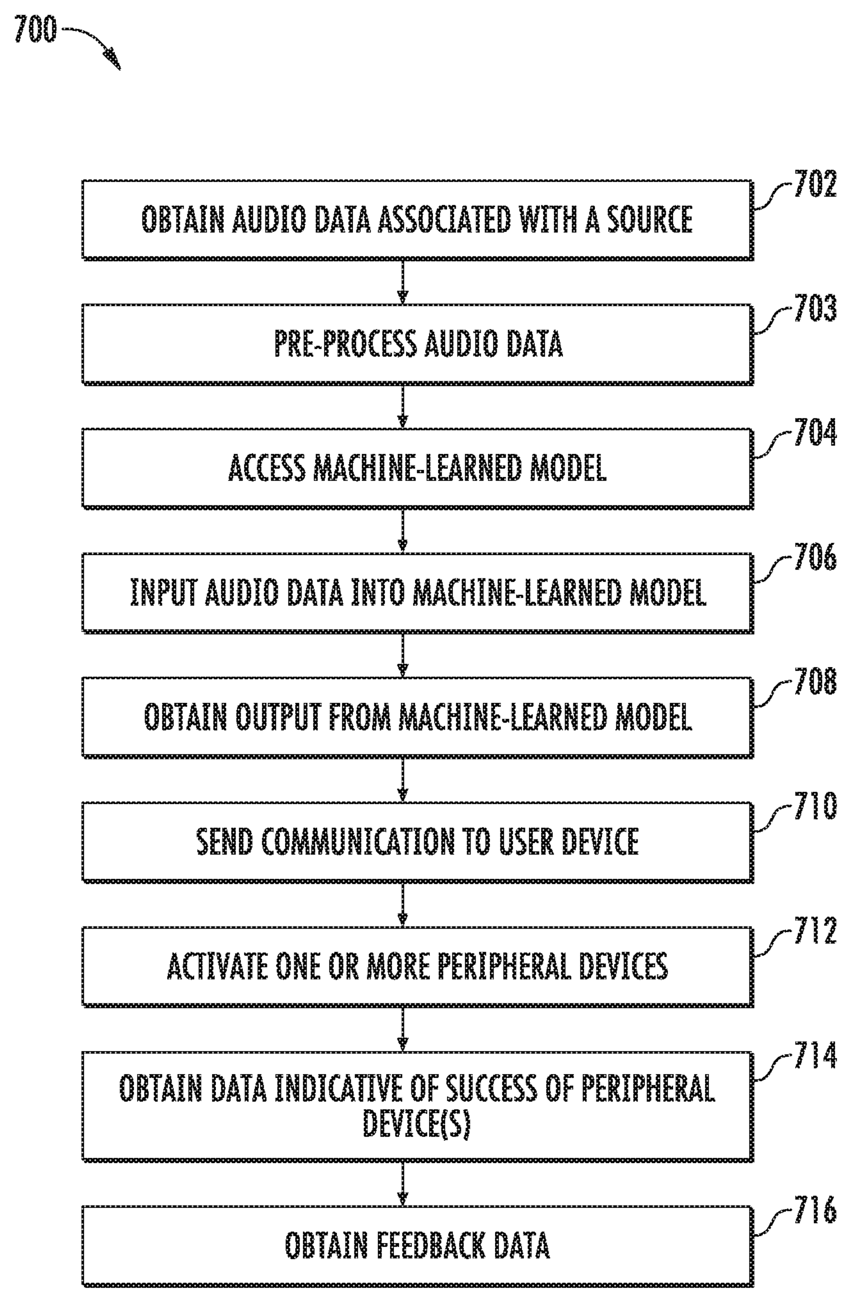
FIG. 7 depicts a flow diagram of an example method according to example embodiments of the present disclosure.

FIG. 7 depicts a flow diagram of an example method 700 of detecting acoustic events according to example embodiments of the present disclosure. One or more portion(s) of method 700 can be implemented by one or more computing device(s) such as, for example, those shown in FIGS. 1 and 8. Moreover, one or more portion(s) of the method 700 can be implemented as an algorithm on the hardware components of the device(s) described herein (e.g., as in FIGS. 1 and 8) to, for example, detect acoustic events. FIG. 7 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (702), the method 700 can include obtaining audio data associated with a source. For instance, the acoustic detection system 105 can obtain audio data 135 associated with a source 130. As described herein, at least a portion of the acoustic detection system 105 can be located within proximity of source(s) 130. The source 130 can produce a sound (e.g., a cry). The acoustic detection system 105 can obtain (e.g., via a microphone, via a vibration-to-waveform processor, etc.) audio data 135 indicative of one or more acoustic signal(s) associated with the sound.

At (703), the method 700 can include preprocessing of the audio data. For instance, the acoustic detection system 105 can process the audio data and extract feature vectors from the audio data. The feature vectors can include individual measurable properties and/or characteristics of the audio data associated with the source (e.g., features of the potential acoustic event). This may include, for example, audio properties and/or characteristics. The feature vectors can be included in input data that is feed into a model.

At (704), the method 700 can include accessing a model. For instance, the acoustic detection system 105 can access data indicative of an acoustic detection model 140 (e.g., a machine-learned acoustic detection model). The acoustic detection system 105 can access a memory that is located within the portion of the acoustic detection system 105 that is proximate to the source 130 (e.g., a local memory that is proximate to the source) and/or access a memory that is remote from the portion of the acoustic detection system 105 that is proximate to the source 130 (e.g., via a wireless network). The acoustic detection model 140 can include, for example, a neural network and/or other types of machine-learned models. As described herein, acoustic detection model 140 (e.g., the machine-learned acoustic detection model) can be trained based at least in part on training data 215 indicative of a test acoustic event that is of a similar type to the acoustic event detected from the source(s) 130.

At (706), the method 700 can include inputting audio data into the model. For instance, the acoustic detection system 105 can input the audio data 135 from the source 130 into the acoustic detection model 140 (e.g., machine-learned acoustic detection model). The input data can include the feature vectors extracted from the audio data. The acoustic detection system 105 can obtain an output 305 from the acoustic detection model 140, at (708). The output 305 can be indicative of the acoustic event associated with the source 130 (e.g., a binary indication that the acoustic event occurred). In some implementations, the output 305 can indicate a type of the acoustic event. Additionally, or alternatively, the output 305 can indicate a confidence level. The confidence level can indicate the acoustic detection model's level of confidence in the occurrence of the acoustic event and/or the acoustic detection model's level of confidence in the type of acoustic event.

At (710), the method 700 can include sending a communication to a user device based on the detection of an acoustic event. For instance, the acoustic detection system 105 can provide data 145 indicative of a notification 405 to a user device 110 of a user 125. The user device 110 can be configured to present the notification 405 on a user interface 400 via a display device 120 of the user device 110. The notification 125 can indicate the acoustic event and one or more responses 410A-F for selection by the user 125. For example, the notification 125 can indicate the occurrence of the acoustic event, a type of the acoustic event (e.g., baby cry), the time of occurrence and/or detection, the duration of the acoustic event, the confidence level associated with the detection, and/or other information. A response 410A can be associated with playing audio data associated with the acoustic event via the user device 110 (e.g., via a speaker and/or other audio output device). A response 410B can be associated with ignoring the acoustic event. Additionally, and/or alternatively, the one or more responses can include an activation of one or more peripheral devices 150 within proximity of the source 130, as described herein. A user 125 can provide user input 415 (e.g., touch input, cursor click, audible input, etc.) to the user interface 400 to select one or more peripheral devices 150 for activation.

At (712), the method 700 can include activating one or more peripheral devices. For instance, the acoustic detection system can obtain data 165 indicative of a selection of at least one of the responses by the user 125. The acoustic detection system 105 can activate one or more of the peripheral devices 150 based at least in part on a selection of at least one of the responses by the user 125, as described herein. In some implementations, the acoustic detection system 105 can activate one or more of the peripheral devices 150 based at least in part on the acoustic event (e.g., without user input). In some implementations, the acoustic detection system 105 can activate one or more of the peripheral devices 150 based at least in part on a random order. In some implementations, the acoustic detection system 105 can activate one or more of the peripheral devices 150 based at least in part on a peripheral device hierarchy 500, as described herein.

At (714), the method 700 can include obtaining data indicative of the success of the one or more peripheral devices. For instance, the acoustic detection system 105 can obtain data 155 indicative of a success of at least one of the one or more peripheral devices 150 in addressing the acoustic event. The acoustic detection system 105 can generate and/or adjust a peripheral device hierarchy 500 based at least in part on the data 155 indicative of the success of at least one of the one or more peripheral devices 150 in addressing the acoustic event. In some implementations, the acoustic detection system 105 can obtain data indicative of a success of one or more second peripheral devices in addressing a second acoustic event, as described herein. The second acoustic event can be of a similar type to the first acoustic event. The acoustic detection system 105 can generate and/or adjust a peripheral device hierarchy based at least in part on the data indicative of the success of the one or more second peripheral devices in addressing the second acoustic event, as described herein.

At (716), the method 700 can include obtaining feedback data indicative of the accuracy of the acoustic event detection. For instance, a response 410F (e.g., presented on the user interface 400) can be associated with identifying the inaccuracy of the acoustic detection system's identification of the acoustic event. The acoustic detection system 105 can obtain feedback data 160 associated with the acoustic event. The feedback data 160 can be associated with user input 415 provided by the user 125 to the user interface 400 (e.g., to select the response 410F to indicate an erroneous detection). The feedback data 160 can indicate that the acoustic event was erroneously detected. As described herein, the acoustic detection system 105 (and/or an associated training system) can train (e.g., re-train) the acoustic detection model 140 based at least in part on the feedback data 160.

Figure 8:
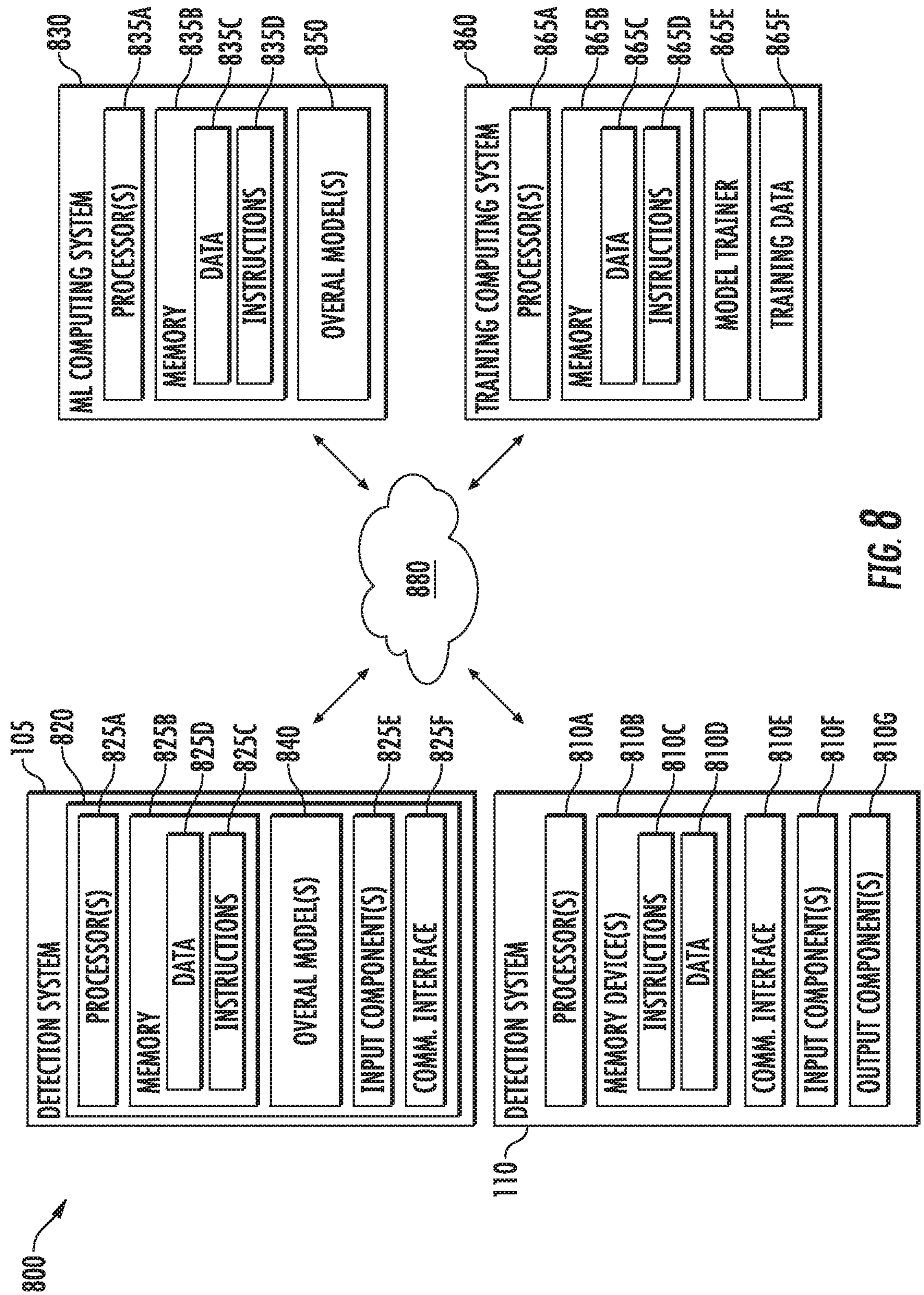
FIG. 8 depicts an example system according to example embodiments of the present disclosure.

FIG. 8 depicts an example system 800 according to example embodiments of the present disclosure. The system 800 can include one or more user device(s) 110, the acoustic detection computing system 105, and a machine learning computing system 830. One or more of these systems communicate over one or more network(s) 880.

A user device 110 can include one or more processor(s) 810A and one or more memory device(s) 810B. The one or more processor(s) 810A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), processing units performing other specialized calculations, etc. The memory device(s) 810B can include memory such as one or more non-transitory computer-readable storage medium(s), such as RAM, ROM, EEPROM, EPROM, flash memory devices, magnetic disks, etc., and/or combinations thereof.

The memory device(s) 810B can include one or more computer-readable media and can store information accessible by the one or more processor(s) 810A, including instructions 810C that can be executed by the one or more processor(s) 810A. For instance, the memory device(s) 810B can store instructions 810C for running one or more software applications, displaying a user interface, receiving user input, processing user input, playing audio data, etc. as described herein. In some embodiments, the instructions 810C can be executed by the one or more processor(s) 810A to cause the one or more processor(s) 810A to perform operations, such as any of the operations and functions for which the user device(s) 110 are configured, and/or any other operations or functions of the user device(s) 110, as described herein. The instructions 810C can be software written in any suitable programming language or can be implemented in hardware. Additionally, and/or alternatively, the instructions 810C can be executed in logically and/or virtually separate threads on processor(s) 810A.

The one or more memory device(s) 810B can also store data 810D that can be retrieved, manipulated, created, or stored by the one or more processor(s) 810A. The data 810D can include, for instance, data indicative of: audio data, an acoustic event, user input, user interface(s), feedback data, etc. In some implementations, the data 810D can be received from another device.

The user device 110 can also include a network interface 810E used to communicate with one or more other component(s) of system 800 over the network(s) 880. The network interface 810E can include any suitable components for interfacing with one or more network(s), including for example, transmitters, receivers, ports, controllers, antennas, or other suitable components.

The user device(s) 110 can include one or more input component(s) 810F and/or one or more output component(s) 810G. The input component(s) 810F can include, for example, hardware and/or software for receiving information from a user, such as a touch screen, touch pad, mouse, data entry keys, speakers, a microphone suitable for voice recognition, etc. The output component(s) 810G can include hardware and/or software for audibly producing audio data (e.g., recording of the acoustic event) for a user. For instance, the audio output component 810G can include one or more speaker(s), earpiece(s), headset(s), handset(s), etc. The output component(s) 810G can include a display device, which can include hardware for displaying a user interface and/or messages for a user. By way of example, the output component 810G can include a display screen, CRT, LCD, plasma screen, touch screen, TV, projector, and/or other suitable display components.

The acoustic detection computing system 105 can include one or more computing device(s) 820 located at the same or different locations. The computing device(s) 820 can include one or more processors 825A and a one or more memory devices 825B. The processor(s) 825A can be located at the same or different locations. Additionally, or alternatively, the memory device(s) 825B can be located at the same or different locations.

The one or more processors 825A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), processing units performing other specialized calculations, etc. The memory device(s) 825B can include memory such as one or more non-transitory computer-readable storage medium(s), such as RAM, ROM, EEPROM, EPROM, flash memory devices, magnetic disks, etc., and/or combinations thereof.

The memory device(s) 825B can include one or more computer-readable media and can store information accessible by the one or more processor(s) 825A, including instructions 825C that can be executed by the one or more processor(s) 825A. In some embodiments, the instructions 825C can be executed by the one or more processor(s) 825A to cause the one or more processor(s) 825A to perform operations, such as any of the operations and functions for which the acoustic detection system 105 is configured, one or more operations and functions for detecting acoustic event(s) (e.g., one or more portions of method 700) and/or any other operations or functions of the acoustic detection system 105, as described herein. The instructions 825C can be software written in any suitable programming language or can be implemented in hardware. Additionally, and/or alternatively, the instructions 825C can be executed in logically and/or virtually separate threads on processor(s) 825A.

The one or more memory device(s) 825B can also store data 825D that can be retrieved, manipulated, created, or stored by the one or more processor(s) 810A. The data 825D can include, for instance, data associated with: a source, model(s), audio data, an acoustic event, user input, peripheral device(s), success of peripheral device(s), feedback data, hierarchies, etc. and/or any other data/information described herein. In some implementations, the data 825D can be received from another device.

The acoustic detection system 105 can also include a network interface 825F used to communicate with one or more other component(s) of system 800 over the network(s) 880. The network interface 825F can include any suitable components for interfacing with one or more network(s), including for example, transmitters, receivers, ports, controllers, antennas, or other suitable components.

The computing device(s) 820 of the acoustic detection system 105 (e.g., located proximate to the source) can include one or more input component(s) 825E. The input component(s) 825E can include, for example, hardware and/or software for receiving information from a source such as, for example, a microphone and/or other audio content capturing technology, etc.

According to an aspect of the present disclosure, acoustic detection system 105 can store and/or include one or more machine-learned models 840. As examples, the machine-learned models 840 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include recurrent neural networks (e.g., long short-term memory recurrent neural networks), or other forms of neural networks. The machine-learned models 840 can include the acoustic detection model 140, as described herein.

In some implementations, the acoustic detection system 105 can receive the one or more machine-learned models 840 from the machine learning computing system 830 (e.g., a server computing system) over the network(s) 880 and can store the one or more machine-learned models 840 in the memory of the respective system. The machine learning computing system 830 can be a portion of and/or separate from the acoustic detection system 105. The acoustic detection system 105 can use or otherwise implement the one or more machine-learned models 840 (e.g., by processor(s) 825A). In particular, the acoustic detection system 105 can implement the machine learned model(s) 840 to detect an acoustic event, as described herein.

The machine learning computing system 830 can include one or more processors 835A and a memory 835B. The one or more processors 835A can be any suitable processing device (e.g., a processor core, a microprocessor, an ASIC, a FPGA, a controller, a microcontroller, etc.) and can be one processor or a plurality of processors that are operatively connected. The memory 835B can include one or more non-transitory computer-readable storage media, such as RAM, ROM, EEPROM, EPROM, one or more memory devices, flash memory devices, etc., and combinations thereof.

The memory 835B can store information that can be accessed by the one or more processors 835A. For instance, the memory 835B (e.g., one or more non-transitory computer-readable storage mediums, memory devices) can store data 835C that can be obtained, received, accessed, written, manipulated, created, and/or stored. In some implementations, the machine learning computing system 830 can obtain data from one or more memory devices that are remote from the machine learning computing system 830.

The memory 835B can also store computer-readable instructions 835D that can be executed by the one or more processors 835A. The instructions 835D can be software written in any suitable programming language or can be implemented in hardware. Additionally, or alternatively, the instructions 835D can be executed in logically and/or virtually separate threads on processor(s) 835A. The memory 835B can store the instructions 835D that when executed by the one or more processors 835A cause the one or more processors 835A to perform operations. The machine learning computing system 830 can include a communication interface, including devices and/or functions similar to that described with respect to the acoustic detection system 105.

In some implementations, the machine learning computing system 830 can include one or more server computing devices. If the machine learning computing system 830 includes multiple server computing devices, such server computing devices can operate according to various computing architectures, including, for example, sequential computing architectures, parallel computing architectures, or some combination thereof.

In addition or alternatively to the model(s) 840 at the acoustic detection system 105, the machine learning computing system 830 can include one or more machine-learned models 850. As examples, the machine-learned model(s) 850 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include recurrent neural networks (e.g., long short-term memory recurrent neural networks, or other forms of neural networks). The machine-learned models 850 can be similar to and/or the same as the machine-learned models 840. In some implementations, the machine-learned models described herein may not include a feed-forward network.

As an example, the machine learning computing system 830 can communicate with the acoustic detection system 105 according to a client-server relationship. For example, the machine learning computing system 830 can implement the machine-learned models 850 to provide a web service to the acoustic detection system 105. For example, the web service can provide machine-learned models to an entity associated with the acoustic detection system 105; such that the entity can implement the machine-learned model (e.g., to detect acoustic events, etc.). Thus, machine-learned models 850 can be located and used at the acoustic detection system 105 and/or machine-learned models 850 can be located and used at the machine learning computing system 830.

In some implementations, the machine learning computing system 830 and/or the acoustic detection system 105 can train the machine-learned models 840 and/or 850 through use of a training computing system 860. The training computing system 860 can be and/or include the training computing system 205, as described herein. The training computing system 860 can include one or more processors 865A and a memory 865B similar to those described herein for the other components of the system 800. The memory 865B can store information that can be accessed by the one or more processors 865A. For instance, the memory 865B (e.g., one or more non-transitory computer-readable storage mediums, memory devices, etc.) can store data 865C that can be obtained, received, accessed, written, manipulated, created, and/or stored. The memory 865B can store the instructions 865D that when executed by the one or more processors 865A cause the one or more processors 865A to perform operations.

The training computing system 860 can include a model trainer 860. The model trainer 860 can train the machine-learned models 840 and/or 850 using one or more training or learning algorithms. One example training technique is backwards propagation of errors. In some implementations, the model trainer 860 can perform supervised training techniques using a set of labeled training data. In other implementations, the model trainer 860 can perform unsupervised training techniques using a set of unlabeled training data. The model trainer 860 can perform a number of generalization techniques to improve the generalization capability of the models being trained. Generalization techniques include weight decays, dropouts, or other techniques.

In particular, the model trainer 860 can train a machine-learned model 840 and/or 850 based on a set of training data 865F. The training data 865F can include, for example, the training data as described herein. The model trainer 860 can be implemented in hardware, firmware, and/or software controlling one or more processors.

The network(s) 880 can be any type of network or combination of networks that allows for communication between devices. In some embodiments, the network(s) 880 can include one or more of a local area network, wide area network, the Internet, secure network, cellular network, mesh network, peer-to-peer communication link and/or some combination thereof and can include any number of wired or wireless links. Communication over the network(s) 880 can be accomplished, for instance, via a network interface using any type of protocol, protection scheme, encoding, format, packaging, etc.

FIG. 8 illustrates one example system 800 that can be used to implement the present disclosure. Other computing systems can be used as well. For example, in some implementations, the acoustic detection system 105 and/or the machine learned computing system 830 can include the model trainer 865E and the training dataset 865F. In such implementations, the machine-learned models 840 can be both trained and used locally at the acoustic detection system 105. As another example, in some implementations, the acoustic detection system 105 may not be connected to other computing systems.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a server can instead be performed at a user device. Likewise, computing tasks discussed herein as being performed at the user device can instead be performed at the server.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for detecting acoustic events, comprising:

obtaining, by a computing system comprising one or more computing devices, audio data associated with a source;

accessing, by the computing system, data indicative of a machine-learned acoustic detection model;

inputting, by the computing system, the audio data from the source into the machine-learned acoustic detection model;

obtaining, by the computing system, an output from the machine-learned acoustic detection model, wherein the output is indicative of a first acoustic event associated with the source; and providing, by the computing system, data indicative of a notification to a user device of a user, wherein the notification indicates the first acoustic event and one or more responses for selection by the user, wherein one or more first peripheral devices are associated with addressing the first acoustic event;

obtaining, by the computing system, data indicative of a success of one or more second peripheral devices in addressing a second acoustic event, wherein the second acoustic event is of a similar type to the first acoustic event; and adjusting, by the computing, system, a peripheral device hierarchy based at least in part on the data indicative of the success of the one or more second peripheral devices in addressing the second acoustic event.

2. The computer-implemented method of claim 1, wherein the source is a human child and the first acoustic event is a cry of the human child.

3. The computer-implemented method of claim 1, wherein the user device is configured to present the notification on a user interface via a display device of the user device.

4. The computer-implemented method of claim 1, wherein the one or more responses comprise an activation of one or more of the first peripheral devices within proximity of the source.

5. The computer-implemented method of claim 1, further comprising:

obtaining, by the computing system, data indicative of a selection of at least one of the responses by the user.

6. The computer-implemented method of claim 5, further comprising:

activating, by the computing system, one or more of the peripheral devices based at least in part on a selection of at least one of the responses by the user.

7. The computer-implemented method of claim 1, further comprising:

activating, by the computing system, one or more peripheral devices based at least in part on the acoustic event.

8. The computer-implemented method of claim 1, further comprising:

activating, by the computing system, one or more of the first peripheral devices based at least in part on the peripheral device hierarchy.

9. The computer-implemented method of claim 1, further comprising:

activating, by the computing system, one or more of the first peripheral devices based at least in part on a random order.

10. The computer-implemented method of claim 1, wherein the output indicates a type of the first acoustic event.

11. The computer-implemented method of claim 1, wherein the output indicates a confidence level.

12. The computer-implemented method of claim 1, wherein the machine-learned acoustic detection model is trained based at least in part on training data indicative of a test acoustic event that is of a similar type to the first acoustic event.

13. The computer-implemented method of claim 1, wherein the machine-learned acoustic detection model comprises a neural network.

14. The computer-implemented method of claim 1, further comprising:

obtaining, by the computing system, data indicative of a success of at least one of the first peripheral devices in addressing the first acoustic event; and adjusting, by the computing system, the peripheral device hierarchy based at least in part on the data indicative of the success of the at least one first peripheral device in addressing the first acoustic event.

15. The computer-implement method of claim 1, further comprising:

obtaining, by the computing system, feedback data associated with the first acoustic event, wherein the feedback data indicates that the first acoustic event was enoneously detected.

16. The computer-implemented method of claim 15, wherein the machine-learned acoustic detection model is trained based at least in part on the feedback data, wherein the feedback data is associated with user input provided by the user to a user interface.

17. A computing device comprising:

one or more input devices;

one or more processors; and one or more memory devices, the one or, more memory devices storing instructions that when executed by the one or more processors cause the one or more processors to perform operations, the operations comprising:

obtaining, via the one or more input devices, audio data from a source;

accessing data indicative of a machine-learned acoustic detection model;

inputting the audio data from the source into the machine-learned acoustic detection model;

obtaining an output from the machine learned acoustic detection model, wherein the output is indicative of first acoustic event associated with the source;

providing data indicative of a notification to a user device of a user, wherein the notification indicates the first acoustic event and one or more responses for selection by the user, wherein one or more first peripheral devices are associated with addressing the first acoustic event;

obtaining data indicative of a success of one or more second peripheral devices in addressing a second acoustic event, wherein the second acoustic event is of a similar type to the first acoustic event; and adjusting a peripheral device hierarchy based at least in part on the data indicative of the success of the one or more second peripheral device in addressing the second acoustic event.

18. One or more tangible, non-transitory computer-readable media storing computer-readable instructions that when executed by one or more processors cause the one or more processors to perform operations, the operations comprising:

obtaining audio data associated with a source, wherein the source is a human child;

accessing data indicative of a machine-learned acoustic detection model;

inputting the audio data from the source into the machine-learned acoustic detection model;

obtaining an output from the machine-learned acoustic detection model, wherein the output is indicative of a first acoustic event associated with a cry of the human child;

providing data indicative of a notification to a user device of a user, wherein the notification indicates the first acoustic event and one or more responses for selection by the user, wherein one or more first peripheral devices are associated with addressing the first acoustic event;

obtaining data indicative of a success of one or more second peripheral devices in addressing a second acoustic event, wherein the second acoustic event is of a similar type to the first acoustic event; and adjusting a peripheral device hierarchy based at least in part on the data indicative of the success of the one or more second peripheral devices in addressing the second acoustic event.

19. The one or more tangible, non-transitory computer-readable media of claim 18, further comprising:

activating one or more of the first peripheral devices within proximity of the human child.

* * * * *